(No Model.)
J. CABOT.
TRAY FOR GAS PURIFIERS.
No. 457,577. Patented Aug. 11, 1891.
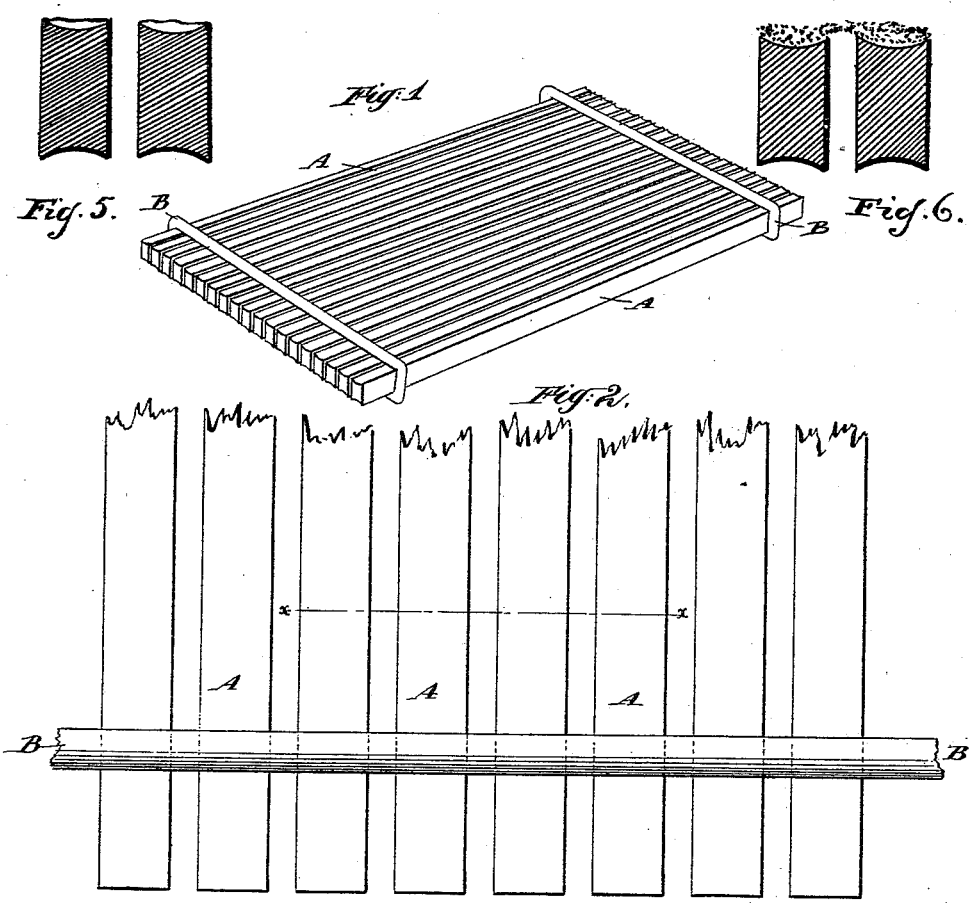
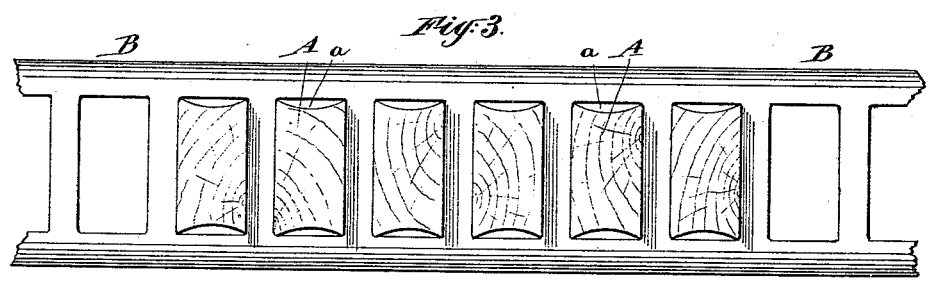
Witnesses:
Charles R. Searle.
Chas. S. Barber.
Inventor:
John Cabot
by his attorney
Thomas Drew Stetson

UNITED STATES PATENT OFFICE.

JOHN CABOT, OF NEW YORK, N. Y.

TRAY FOR GAS-PURIFIERS.

SPECIFICATION forming part of Letters Patent No. 457,577, dated August 11, 1891.

Application filed January 24, 1890. Serial No. 337,924. (No model.)

*To all whom it may concern:*

Be it known that I, JOHN CABOT, a citizen of the United States, residing in the city and county of New York, in the State of New York, have invented a certain new and useful Improvement in Trays for Gas-Purifiers, of which the following is a specification.

My tray is intended more particularly for use with "iron sponge," which may be broken to the ordinary sizes with the ordinary or even an unusual proportion of fine dust without any considerable quantity falling through the grates.

My tray-slats may be of wood, and I will describe the invention as thus carried out. They give a sufficient opening for the ascent of the gas between them. The form of the cross-section promotes the arching of the grains of purifying materials across the spaces by the form directly, and also by supplying water to moisten the grains which are immediately in contact with the slats. The slats are approximately rectangular; but the upper edges are hollowed so as to promote the retention of a stratum of water on the top. Before the purifying material is supplied water is thrown on the tray from a hose or other suitable appliance sufficient to thoroughly saturate the pores of the wood and to make a shallow pool on the upper surface. When the loose material is shoveled in, the particles immediately in contact with the tray absorb water and adhere together, thus bridging the space between each slat and the adjacent ones. The material above may be dry. I have demonstrated by experiment that when thus worked but a small quantity will fall through my grate, however finely the material may be broken.

My slats are preferably held together by the mode set forth in the patent to Church in 1878. I prefer to make the tops and bottoms alike, so that the trays may be reversed. The apertures in the iron bars should not match tightly into the hollow upper and lower faces; but must stand off enough to allow the water to flow readily along in the hollow channel from one side to the other of the iron bar. This allows the water, which may be thrown upon the bars irregularly through a hose or otherwise, to distribute itself uniformly along the whole length of each slat.

The accompanying drawings form a part of this specification and represent what I consider the best means of carrying out the invention.

Figure 1 is a general perspective view. The remaining figures are on a larger scale. Fig. 2 is a plan view of a portion. Fig. 3 is an end view, and Fig. 4 is a cross-section on the line $x\ x$ in Fig. 2. Fig. 5 is a cross-section showing two adjacent slats for holding water before the iron sponge is applied, and Fig. 6 is a corresponding cross-section showing the same at a later stage after the loose iron sponge has been shoveled in and the particles have soaked up the water and formed a slightly coherent mass bridging across the space and forming a continuous porous flooring on which the loose material above may rest.

Similar letters of reference indicate corresponding parts in all the figures where they appear.

A A, &c., are nearly rectangular slats of spruce or other suitable wood of porous character and straight grained. The top and bottom of each slat A is hollowed, as indicated by $a$. The slats may be sawed to the proper size and the hollowing may be produced by running them through a molding-machine equipped with suitable cutters. The slats are forced into close-fitting cross-bars B of malleable cast-iron having suitably-spaced rectangular openings of proper size to receive and hold them tightly. The slats may be of the ordinary length and aggregated in trays of about the ordinary size.

My tray may be treated in all respects in the same manner as the Church tray referred to. The material of the slats A $a$ may be varied. The number of the cross-bars B may be increased or diminished. The form of the apertures in the bars B shall be rectangular, so that they shall take hold on the slats A $a$ only by narrow surfaces near each angle. This permits the water to flow freely along in the channel in the top of each slat, the presence of the iron bar offering no serious obstruction. The apertures match tightly against the lateral faces of the slats.

The means for holding the slats may be varied. I can bolt them together, using suitable blocks or washers to hold them the proper small distance apart.

After the trays are placed in position water is supplied until the slats A are saturated and the hollows $a$ in the upper faces filled with water. Then the iron sponge or other purifying material in a dry powdery condition is put in and the water which has saturated the absorbent material of the slats, aided by the water standing in the hollows $a$, dampens the purifying material adjacent, and by the permeation of the water laterally as well as upward the stratum is made continuous, bridging across the spaces between the slats A and forming a base on which the dry powder above may rest without falling through. The conditions attained are eminently favorable for the easy traverse of the gas through the purifying material and without any considerable quantity of the latter being allowed to fall through the trays.

I claim as my invention—

1. In a tray for gas-purifiers, two or more metallic cross-bars B, having spaced openings, and a series of slats A, of absorbent material, extending through such openings, the slats having hollowed upper faces $a$, combined and arranged to serve with granular material and water, and with a current of gas flowing upward through such tray, as herein specified.

2. A reversible tray for gas-purifiers having the metal bars B, with spaced openings, with slats of absorbent material hollowed both on the upper and lower faces adapted to retain water and to allow it to be absorbed and again given out to granular material and to thereby bridge across the spaces with the wetted grains in either position, as herein specified.

In testimony whereof I have hereunto set my hand at New York city, this 22d day of January, 1890, in the presence of two subscribing witnesses.

JOHN CABOT.

Witnesses:
CHARLES R. SEARLE,
CHARLES S. BARBER.